Sept. 1, 1925.
P. O. KUEHN
1,552,063
LIVE BEARING FISH BREEDING DEVICE
Filed June 17, 1924
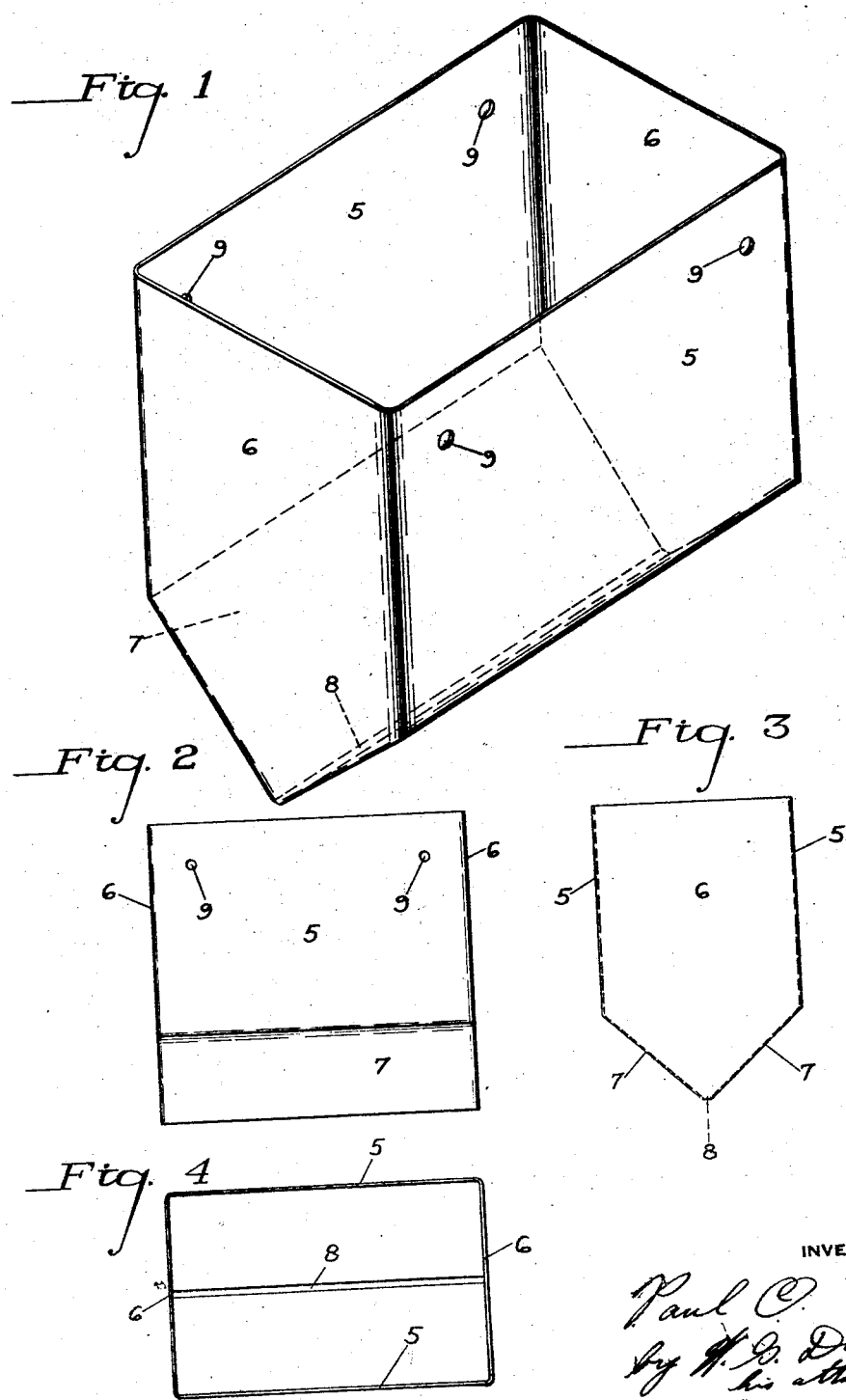
INVENTOR
Paul O. Kuehn
by W. D. Doolittle
his attorney.

Patented Sept. 1, 1925.

1,552,063

UNITED STATES PATENT OFFICE.

PAUL O. KUEHN, OF PITTSBURGH, PENNSYLVANIA.

LIVE-BEARING-FISH-BREEDING DEVICE.

Application filed June 17, 1924. Serial No. 720,557.

*To all whom it may concern:*

Be it known that I, PAUL O. KUEHN, a citizen of the United States, residing at Pittsburgh, in the county of Allegheny and State of Pennsylvania, have invented certain new and useful Improvements in a Live-Bearing-Fish Breeding Device, of which the following is a specification.

This invention is for a device for breeding fishes, and particularly live-bearing fishes for the aquarium.

Several species of fishes of tropical origin are found in the aquarium of fish fanciers, which are especially peculiar because of the fact that their young are born alive, instead of being hatched from eggs that are deposited in the water, as are most species of fish. Such fish are generally referred to as live-bearing fish.

It frequently happens that the female parent will devour her young as they are born and, consequently, great care must be taken to protect the young immediately after their birth.

The present invention has for its objects to provide a breeding device or cage adapted to be suspended in a tank or aquarium, into which the female may be placed prior to the birth of the young, and which has sloping bottom walls that converge toward each other, a narrow opening being provided at the point of intersection. The young fishes, being at first unable to swim, gravitate through the slotted bottom of the cage immediately after they are born, and will thus be separated from the parent.

The invention may be readily understood by reference to the accompanying drawings, in which:

Fig. 1 is an isometric view of the device or cage;

Fig. 2 is a side view thereof, on a smaller scale;

Fig. 3 is an end view thereof; and

Fig. 4 is a top side view of the device.

In the drawings, 5 indicates the parallel vertical side walls of the device, and 6 are the vertical end walls. The top of the device is substantially rectangular in shape. The lower portions 7 of the sides are inclined, and converge to form a troughed bottom, a narrow slot 8 being formed at the point of intersection. The end walls are vertical throughout their height, so that the slot 8 is substantially co-extensive with the length of the device.

In the walls 5 at any suitable points, are openings 9 through which hooks or other suspending means may be passed to suspend the device in an aquarium or tank, with the top of the device above the water-line of the tank.

The device is formed entirely of glass, and is so shaped that it can be readily molded in a single operation.

In use, the device is suspended in a tank or aquarium, with its top above the water-line of the aquarium. The parent fish is placed in the cage, and as the young are born, they sink down and are directed by the sloping bottom walls through the elongated slot 8 into the aquarium. The parent fish is confined, however, so that she may not escape and devour the young.

The elongated slot provides ample space for the escape of the young, and will not readily become stopped up.

I claim as my invention:

1. A breeding device for live-bearing fishes comprising an integral glass body having vertical side and end walls, the lower portions of the side walls sloping inwardly to form a troughed bottom, the lower edges of the sloping bottom portions being spaced apart to provide an elongated narrow slot.

2. A breeding device for live-bearing fishes comprising an integral glass body having vertical side and end walls, the lower portions of the side walls sloping inwardly to form a troughed bottom, the lower edges of the sloping bottom portions being spaced apart to provide an elongated narrow slot, said body having openings therein near the top thereof for the reception of suspending means.

In testimony whereof I affix my signature.

PAUL O. KUEHN.